United States Patent [19]

Ligon, Sr. et al.

[11] Patent Number: 4,810,548

[45] Date of Patent: Mar. 7, 1989

[54] SANDWICH SEAL FIXTURE

[75] Inventors: James T. Ligon, Sr., Almont; Thomas L. Coon, Burton; Joseph R. Peters, St. Clair, all of Mich.

[73] Assignee: Ligon Brothers Manufacturing Company, Almont, Mich.

[21] Appl. No.: 226,816

[22] Filed: Aug. 1, 1988

[51] Int. Cl.[4] .................. B32B 1/00; B32B 3/00; B32B 3/26

[52] U.S. Cl. ........................ 428/71; 428/76; 428/122; 428/188

[58] Field of Search .............. 428/71, 76, 122, 188

[56] References Cited

U.S. PATENT DOCUMENTS 4,565,723  1/1986  Hirsch .................. 428/71
4,725,471  2/1988  Imhoff ................. 428/71

Primary Examiner—William J. Van Balen
Attorney, Agent, or Firm—Miller, Morriss and Pappas

[57] ABSTRACT

A sandwich-like fixture of expandable foam material as a core between two registering flanking plates of relatively rigid material and means through the plates securing the expandable material and plates in assembled contact relation. One or more of the plates include stabilizing and orienting feet or tab means for securing the fixture in selected position in relation to elements forming a passageway. The fixture is sized in respect to the passageway so as to provide clearance in order to achieve ingress and egress to the passageway. Then, by actuating the expandable foam material by application of heat the expanding foam closes and seals the passageway by filling the clearance between fixture and walls of the passageway with adhesive foamed material at selected points where the fixtures are positioned.

8 Claims, 3 Drawing Sheets

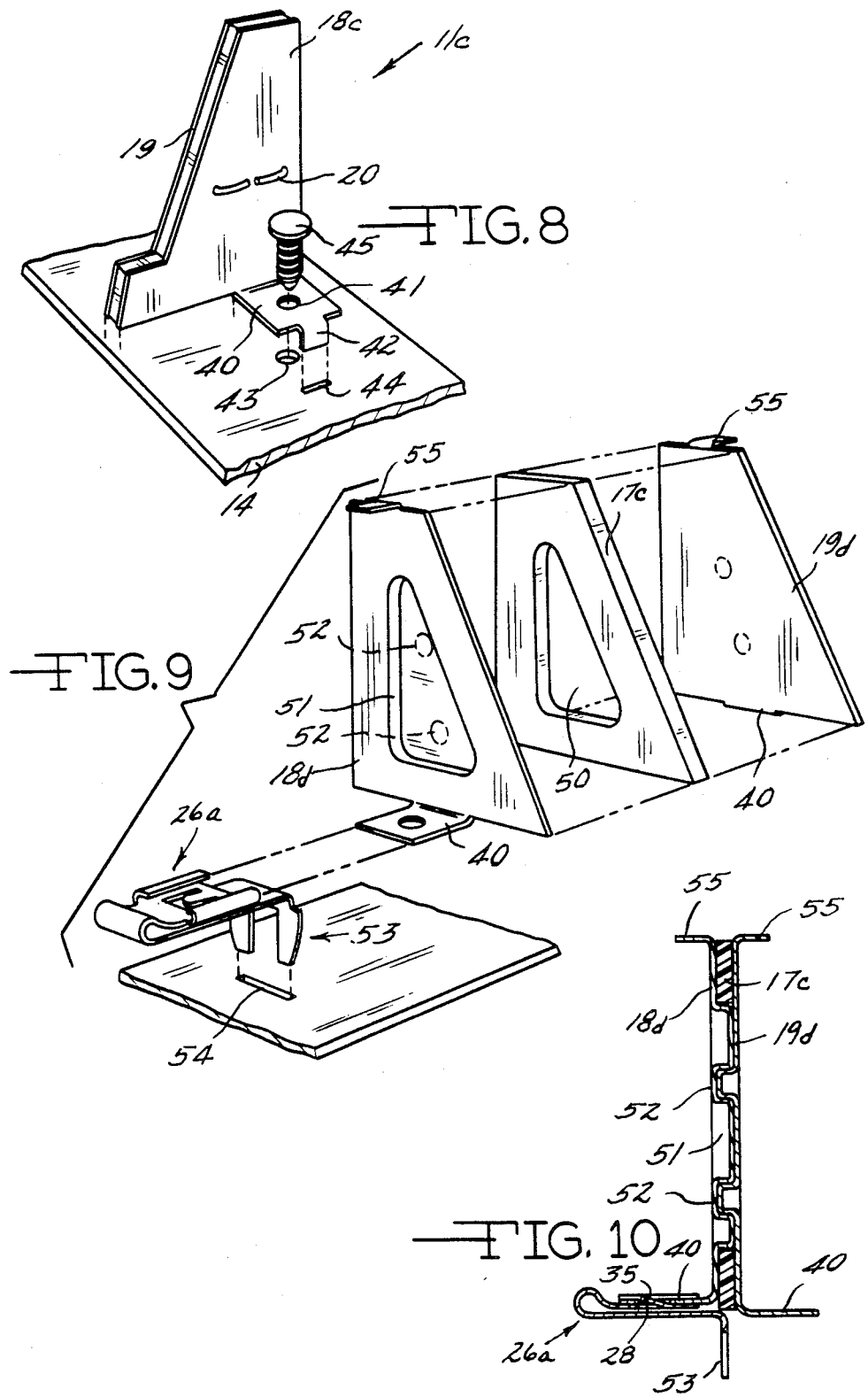

SANDWICH SEAL FIXTURE

The present invention relates to a sandwich seal fixture and more particularly to devices comprising a pair of spaced apart wall plates selectively and registrably configured to conform, generally, to the internal contour of a passageway but sized so as to provide a clearance fit in the passage. The two wall plates registrably secure therebetween a sheet or panel of heat expanding foam-like adhesive material and means is provided to secure the sandwich of plates and expanding material so that upon expansion the expandable material is directionally flow controlled by the plates resulting in a perimeter expansion which seals and adheres to the passage interior and closes all orifices around and through the fixture and effectively blocking ingress or egress through the passage at the position of the fixture. A plurality of variant securing means for initial positioning of the fixtures in passageways to be ultimately blocked are shown. The importance of fixture configuration is in the erection of the fixture to form a selected barrier or seal at a selected location by exposure of the fixtures to actuating condition such as heat.

In the automobile industry there has been increasing interest in coating body and frame cavities internally as well as externally. In part this is because automobile frames and body sections are now dip coated and the coating must drain from the cavities and passages and then it is desired to block the passages after draining so that the intrusion brine watery mud, caustics, gases and other debris is prevented. Such closing off of passages is difficult and to date any simple procedure is offset by substantial time requirements for welding of barrier plates, erection and perimeter coating of barrier plates and in such a manner as to not interfere with the manufacturing process for the bodies and frames fashioned from composite elements of metal or resin materials.

The present invention seeks to provide simple means to achieve the selective erection of the fixtures with clearances sufficient to avoid interference with assembly holding and welding of the body and frame elements and to allow ingress and egress of flowing material such as industrial coatings and, then, to activate the foamable expanding core to achieve an effective seal closing the passage to further ingress and egress. In the automotive field heat is applied to the coating retained on body and frame and that heat is preferred to activate the foamable core.

As a consequence of passage blocking by the present invention, automotive body and frame are better protected from corrosion and the automobile interior is ultimately better sealed against the intrusion of liquid, gas and sound penetration in a very economic way because preassembly can be made very accurately prior to welding assembly of composite body and frame elements.

BACKGROUND ART

The following U.S. Letters Patent to Zimmermann No. 2,782,887, Fitzgerald et al No. 3,493,257, and Strumbos No. 3,834,961 provide an historic perspective or background for the present invention up to the threshold of the new useful and unobvious fixtures and procedures of the present invention. These pieces of prior art indicate that it is old to place a foamable core between two rigid plates and that it is old to heat-activate foam composition between adjacent panels in which the panels are either fixed or deployed. The work of applicants exploits a fixture in composite form with locating and securing means and selectively heat actuated as by means attending automotive coating and securing procedures.

The principal object of the present invention is to provide a Sandwich Seal Fixture which is economical to produce, easy to install in prearranged positions; and which selectively achieves sealing of passageways by expansion of a foamable sealing material retained registrably between registering stiff and relatively rigid outer plates so that upon expansion the foamable sealing material fills the peripheral void between passage and fixture. The fixtures are sized for clearance in respect to the size of the passage opening at the selected location of use to allow coating material to flow into the passageways upon, for example, dipping and then the coating material is allowed to flow out of the passageways for curing as by subsequent baking. The described fixtures utilize the baking or curing heat for actuating the expandable core and the foamed material closes all gaps between the fixture and the interior surfaces of the passageway to be blocked.

Other objects include improved automotive assembly procedures made possible and economic in use of the described fixtures and will be apparent to those ordinarily skilled in the automotive manufacturing arts as the description proceeds.

Still other objects include the simplicity of manufacture and assembly of the fixtures of the present invention.

Other objects will be appreciated as the description proceeds.

Figure 3:
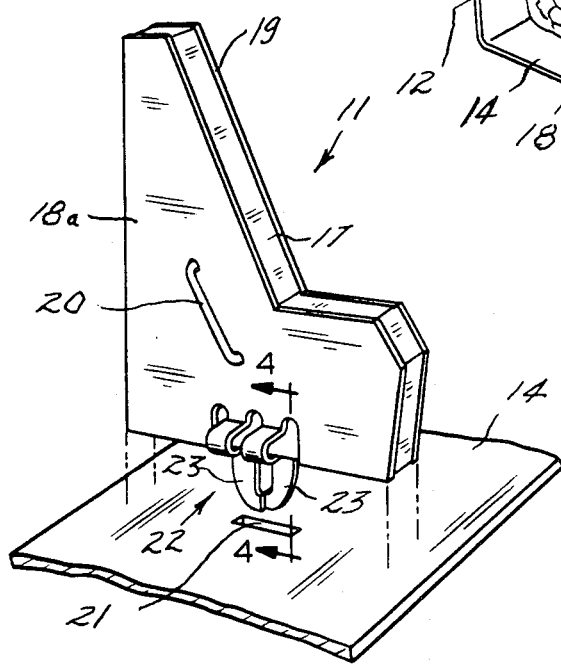

FIG. 3 is a perspective view of a fixture of the present invention illustrating the spaced apart relatively rigid plate-like element which sandwich therebetween a sheet or block of expandable foamable resin material which is selectively activatable as by heat and which shows a stable-like registrable retention of the sandwich seal fixture of the present invention and poised for clip insertion of assembly and retention tabs integrally extending from one of the plate like elements to connection on the floor panel of a part to become an element in a body or frame section for example in an automobile.

Figure 4:
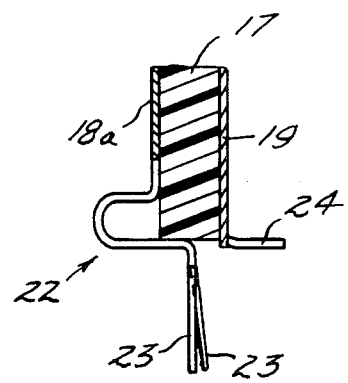

FIG. 4 is a cross section fragmented elevational view of the structure of FIG. 3 taken on line 4—4 of FIG. 3 and illustrating the integral spring clip tab as insertable in the precision lanced opening seen in the floor panel of FIG. 3 and lockably retaining the fixture in a precision selected location.

Figure 5:
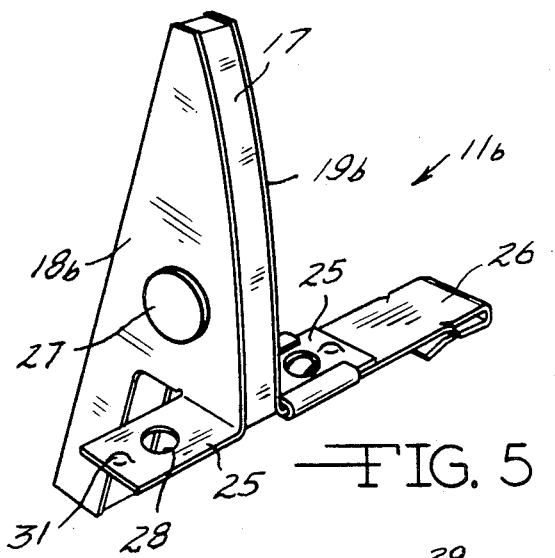

FIG. 5 is a modified version of the present invention and indicating a single stamping forming the two plate-like portions and with tab extensions, one of the tab extensions selectively retaining a spring clip and including a fastener which together with bridging elements, establishes the means of retaining the core portion in sandwich relation.

Figure 6:
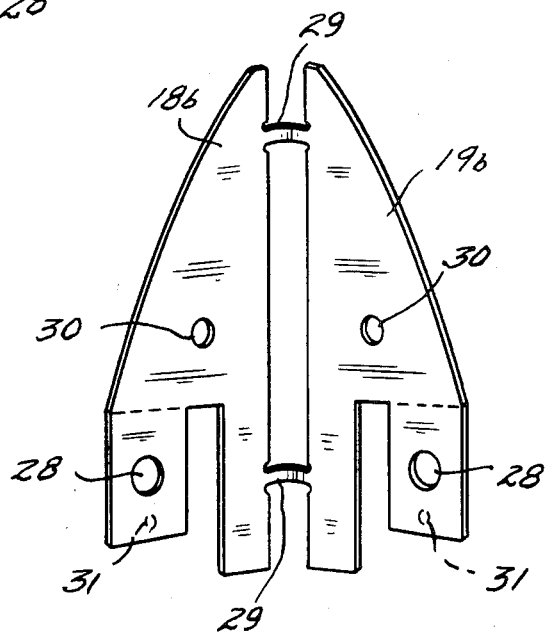

FIG. 6 is a perspective view of the wrapper of the sandwich seal fixture and indicates the integral character of the element forming the two plate-like elements in FIG. 5 and the integral bridging and the tab extensions with fold lines indicated.

Figure 7:
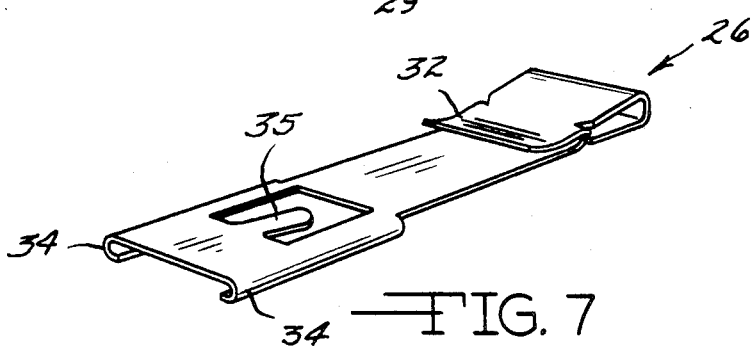

FIG. 7 is a perspective view of the spring clip as shown in detented position in FIG. 5 for retaining the fixture by clipping the clip to edges of adjacent structure where desired.

FIG. 8 is a perspective exploded view of a fixture in accord with the present invention and poised slightly above a floor piece of a passageway and indicating the combination of fastener (self tapping screw) in combination with a foot tab and index flange.

FIG. 9 is a perspective exploded view of a sandwich seal fixture in which a stabilizing foot tab functions in coordination with a spring clip positioned by a slot in the floor plate and the clip detentably receiving one of the foot tabs of the sandwich seal fixture. In phantom line the locations of bridging supports between the sandwich plates and the depressed one plate is seen to index in reference to the central opening of the expandable foam core.

FIG. 10 is a full section view of the completed fixture of FIG. 9 and taken through the detenting clip revealing the fastening means for the bridging portions as formed by deep-drawing and lock-forming.

GENERAL DESCRIPTION

In general, the Sandwich Seal Fixtures of the present invention are compound structures comprising a pair of plate-like, generally planar elements in spaced apart registering relation to each other and sandwiching therebetween a sheet of selectively actuatable foamable resin and sealing composition. The sheet of foamable material is in perimeter registry with said plate-like elements. Fastener elements as between the plate-like elements secure the plate-like elements in relatively rigid spaced apart relation and holding therebetween in sandwich registry relation a core element comprising the sheet or block of foamable, selectively actuatable resin material. The plate-like elements may be integral with the two spaced apart positions folded to registrably confine therebetween the foamable expandable and sealing core material. In such devices the bridging structure between the two plates forms a part of the retention means between the two plate-like elements and assists in the securing of the foamable core material. In such fixtures locating and steadying or orienting tabs are extended from one or both of the plate-like elements to erect, locate and anchor the fixtures against adjacent structure. As desired in some instances integrally formed spring clips are integral with the plate-like elements as tabs for gripping edges of adjacent structure. Tabs may be provided that include provision for fastening the fixtures to adjacent structure as by rivets, screws, and separate clips secured to tabs on the plate-like elements by connector means. The fixtures may, while including the tabs, clips and recited connectors, include deep drawn portions in the planar surfaces of the plate-like elements such as to nest the deep draw of one element in the cavity of the deep draw in the other of the opposite plate-like element and then the matching pieces are upset by crimping to fix the plate like elements in spaced apart registry while orienting and securing the foamable expandable core sheet therebetween. In such instances, as also by weld contacts between adjacent spaced apart plate-like elements, the foamable material may be in a form circumscribing the spacing interval for the bridging connection between the spaced apart plate like elements.

In use, the fixtures of the present invention are applied to closing passageways or openings in, for example, metal or resin laminate material as found in automobile frames and body sections. The fixtures are applied to one or more of the parts of the composite elements forming the walls of the passageway and are especially useful when applied to the parts of the composite elements at assembly and during fabrication of the composite element prior to closing as by welding. Examples of such composite assemblies are door post sections. The fixtures are located selectively as by means of the described tabs and clips to hold a precision location while rigid enough to assure clearance between the walls of the passageway and fixture as ultimately established by the composite elements as a part of the automotive frame or body.

As thus located within the final assembly the assembly is dipped into a coating bath so that coating extends past the fixtures and into all passageways. The coating is cured and in the automotive industry this is achieved as by baking which subjects parts and coating to a relatively hot atmosphere. Where thus exposed to heat the foamable material of the core is activated and the resin material expands and closes the gap as between the fixtures and the adjacent passageways. Thus blocking and sealing the area surrounding the fixture perimeter. Procedurally, the assemblage of passageway blockers includes the erection and location of sandwich seal fixtures at selected positions on a passageway part which will become a composite element defining a hollow opening or passageway. The parts are assembled as by welding; the composite structures including passageways are dipped in a coating which flows into and around the fixtures; then the coating is cured and baked at an elevated temperature ample to activate the expansion of the core foamable element; whereby the resin material of the core expands around the perimeter of the plate-like elements and tabs of the fixtures to adhere and seal to the walls and block the passageways where desired. Used in this consequent process substantial fabricating economies are obtained.

SPECIFIC DESCRIPTION

Figure 1:
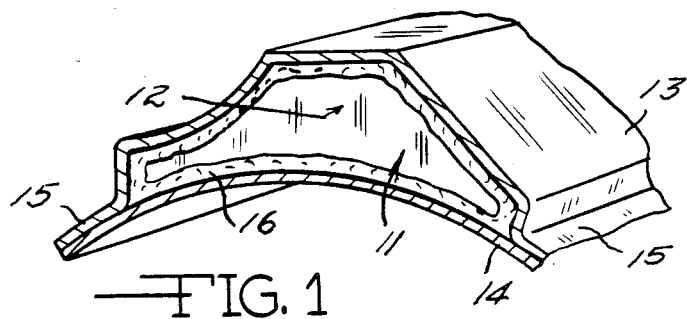
FIG. 1 is a perspective view of a passageway blocked by the present invention and cut away to illustrate the fixture in accord with the present inventive sealing action as between the fixture and the internal walls of the passageway after selected activation of the sealing material and peripheral closing the gap between fixture and walls of the passageway.

Referring to the drawings and with first reference to the FIG. 1 the Sandwich Seal Fixture 11 is shown in sealed position closing a passageway 12 as found in automotive body frame sections formed by the joining of a cap element 13 and a floor element 14 seam welded at the juncture of flange 15 and floor 14. It will be appreciated that more elements may comprise the walls of the passageways. Once in situ, the sandwich seal fixture 11, when heated, is expanded and the foam resin material is expanded and closes to seal any gap at the perimeter of the fixture 11. As will be seen until heat is applied processing as by flowing coating material in and out of the passageway 12 can continue. The resin as it is foamed and expanded by heat adheres to the fixture 11 and to the adjoining surface edges and any coating of the passageway 12 as defined by the bead of resin 16. This serves to close the passageway 12 at selected points defined by the location of the sandwich fixtures 11 at, after or subsequent to the manufacture of the composite passageway 12. As will be seen this sealing and location is facilitated by precision location of index fixing points for the sandwich fixtures in the process of automobile body and frame manufacture.

The perimeter configuration of the fixtures 11 will be appreciated as roughly dimensioned to be similar to but offset from the walls of passageway 12 until the expansion of the foam core.

As the description proceeds the material forming the passageway 12 is usually steel or other metal as aluminum and alloyed material. In recent years composite body and frame sections of laminar resin material also find use and the fixture 11 of the present invention are usable with all of such materials. The sizing of the barrier or block placed in the passageway is such as to permit ingress and egress of finish material as paint lacquers and the like as encountered at dipping the body and frame and then, during curing at the application of baking heat the core 17 expands guided by the fixture 11 to achieve the resultant isolating bead of resin and to secure blockage of the passageways against air, water and gases or vapor.

Figure 2:
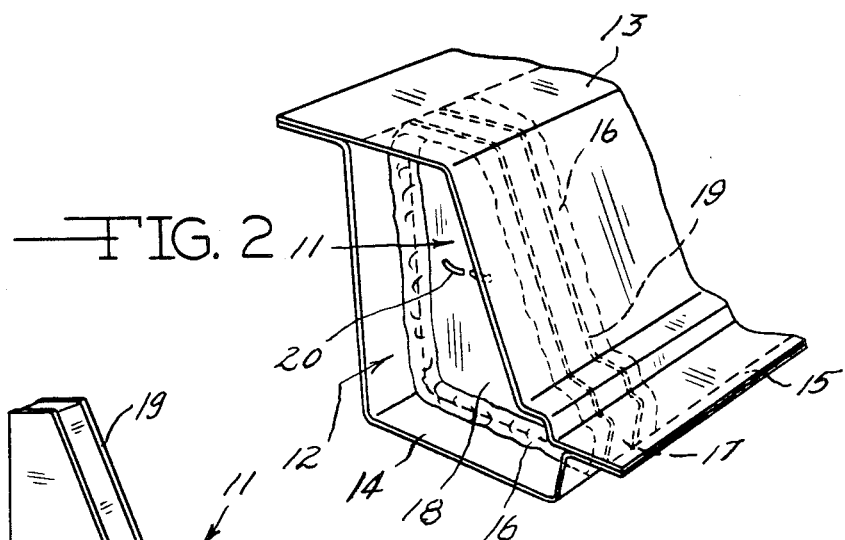
FIG. 2 is a cut-away perspective view of a fixture of the present invention adjacent the end of a typically configured passageway or opening in a door-post section of an automobile and with a resin bead expanded to close and seal the passageway. The retainer means for maintaining the assemblage of the fixture is shown.

In the FIG. 2 the construction of the sandwich seal fixture 11 is better revealed in phantom-line in the passageway 12 and conforming to the opening thereof formed by closure of the walls 13 and the floor 14. The fixture 11 is seen after expansion of the core 17 sandwiched between the relatively rigid plates 18 and 19. Thus the sandwich of plates 18 and 19 and intermediate core 17 is formed all in register with each other and the plates 18 and 19 support the sheet of expandable foamable material of the core 17. The plates 18 and 19 are held together so that they remain in spaced apart parallel registry to control the peripheral expansion of the resin upon activation as by application of baking heat to the body or frame section in which the fixtures 11 are found. The holding or retention means in FIG. 2 is a staple 20 and other fastening means (preventing lateral displacement), are useable. The staple 20 is driven transversely through the sandwich of plates 18 and 19 and the intermediate core 17 and anchor the sandwich fixture 11.

By reference to FIG. 3, relative to the fixture 11, the simple expedient of a spring clip 22 integrally extending from the plate 18a can be snapped into position in the slot or opening 21 in the floor element 14 which ultimately will be one wall of the passageway 12. The opening 21 is precision located as by punching or lancing as by lasering the floor 14 at manufacture. Then the fixture 11 is plugged into the opening 21 at an appropriate stage of assembly. The integral spring clip 22 collapsing inwardly and then expanding outwardly to retention in the opening 21. These clips 22 appear only in the plate 18a and the prongs 23 overlap each other as best shown in FIG. 4. The plate 19, may include an orienting foot piece or tab 24 as shown.

In FIG. 5 the plates 18b and 19b of the modified version of sandwich seal fixture 11b are shown in flank register and in support of the sheet or core element of expandable material 17. The detenting integral support feet or foot tabs 25 extend from the plates 18b and 19b and one of the foot tabs or feet 25 is detentably connected to the separable spring clip element 26 providing a rigid edge connection means. The plates 18b and 19b are shown secured together against the core element 17 by the fastener 27. Where desired the openings 28 in the feet 25 accommodate a screw, fastener, or rivet for selected alternate connection in a passageway 12 (not shown in FIG. 5).

In FIG. 6 the integral forming of the plate 18b, plate 19b and tabs 25 in blanked form before bending of the tabs 25 is illustrated the plate-connecting integral bridge straps 29 which together with the fastener 27 orients and secures the plate portions 18b and 19b together in registering grip on the intermediate expandable core 17. The opening 30 in the plate portions 18b and 19b accommodate the fastener, rivet or screw 27. The advantage of this fixture 11b is that the stamping, forming, lancing and dimpling at 31 can be achieved readily using simple dies and progressive forming. The dimple 31 is primarily to prevent improper assembly of clip 26 to foot 25. FIG. 7 provides a more detailed presentation of the spring clip 26 useable on either of the tabs or feet 25. One end of the clip 26 is turned over upon the clip and the contacting edges thereof are upset to grip surfaces between the receiving lip 32 and the platform extension 33. At the opposite end are a pair of edge-rolled guide rails 34 integral with the main body of the clip 26. These rolled edges 34 slide over the feet 25 as shown in FIG. 5 and the detent tongue 35 is depressed upon connection and pops into and detentably locks in the opening 28 through the foot 25 as can be seen in FIG. 5.

In the FIG. 8 a variant of the Sandwich Seal Fixture 11c is expressed generally following the description of FIG. 3 except that a foot 40 integrally extends from one or more of the plates 18c and 19 at the base thereof, as shown and the foot 40 includes a fastener opening 41 and a downturned tab extension 42. The plates 18c and 19 sandwich therebetween the registering expandable sheet of material 17. Then the attachment of fixture 11c to floor element 14 is through the openings 43 and 44 respectively receiving fastener 45 thereby stabilizing and orienting the fixture 11c in a plane across the passageways 12 and transverse to the plane of floor element 14 in preventing of rotational displacement.

As will be appreciated the fastening may be by means of screws, rivets, push pins, welds or mastics as covenient.

FIG. 9 is a form of sandwich seal fixture in which plates 18d and 19d are provided in parallel spaced apart registry with a sheet of expandable foam material 11c in which an opening 50 is provided and positioned for the entry of the draw 51 in the plate 18d so that the plane at the depth of draw 51 rests against the plate 19d for securing registrably the core 17c. That registration is for the purpose appreciated by FIG. 10 in fastenings known as the TOG-L-LOC (a registered U.S. Trademark of BTM Corporation) and achieved by means and procedures of that corporation so that while the plates are in contact at the draw 51 further local draws 52 (shown in phantom location in FIG. 9) extend with corresponding draws in the plate 19d and are crimped or formed together in prevention of removal. In FIG. 9 the foot extensions 40 are provided in one or more ends of the plates 18d and 19d to detentably receive a spring clip 26a which conforms generally to the clip 26 seen in FIG. 7 and including a spring prong depending extension 53 for inward deflection upon entry to a locating slot opening 54 provided in the floor 14 and which spring prong extension 53 thereupon can expand and lock in the slot 54. By reference to FIG. 10 the clip 26a is best shown for selected connection to the floor element 14. In addition the integral positioning stabilizers 55 (parallel to contact walls in passageway 12) are readily visible. The detenting as between tongue 35 and opening 28 in the foot 40 is easily comprehended.

The plates 18, 19 are stamped from relatively light guage metal sheet and are easily positioned and assembled to secure the expandable foam material therebetween. The plates 18 and 19 may also be stamped from sheet resin or plastic stock of a rigidity to direct flow of expanding resin foam material in a peripheral or perimetric manner.

Expansion is accomplished by heat and the heat is preferably that heat incidental to the processing of the coating material after dipping of the body or frame section. The activating temperature is adjustable by formulation and the expandable material in sheet form is available from Ciba-Geigy Chemical Company, from L & L Industries of Michigan and other preparers of thermally expandable material.

Having thus described our invention and the preferred mode of use and manufacture those ordinarily skilled in the art will appreciate improvements, modifications and changes and such improvements, modifications and changes are intended to be included as within the spirit of the present invention and limited only by the scope of the appended claims.

We claim:

1. A sandwich seal fixture comprising: a pair of spaced apart rigid plate-like elements in registry with each other; retaining means establishing said plate-like elements in spaced apart parallel relation; a foam composition sheet positioned and secured in register with and between said plate-like elements; and locating, orientating and steadying means in support of said fixtures;

2. A sandwich seal fixture as in claim 1 wherein said means in support of said fixture is integral with at least one of said plate-like elements;

3. A sandwich seal fixture as in claim 2 wherein said retaining means which establishes said plate-like elements in spaced apart relation are integral with said plate-like elements;

4. A sandwich seal fixture comprising: a pair of plate-like rigid walls secured in spaced apart parallel relation and having registering peripheral configuration; a sheet of heat activatable foam composition confined between said walls and in registry thereagainst; one or more tab-flange extensions; and at least one clip element selectively secureable to said tab-flange extension and said clip element having a spring clip foot for compression gripping and securing said sandwich fixture in selected orientation and position against dislodgment.

5. A sandwich fixture in accord with claim 4 wherein said spaced apart plates are secured in perimetric spaced relation while one or both inner portions of their configured perimeter are depressed to contact against each other and are thereupon secured in registering attachment and wherein said sheet of foam activated composition is cut to form a gasket-like form in outer perimeter registry with said plate-like elements and closing against said depressed inner portions of said plate like eleents.

6. In the structure of claim 5 wherein said means for securing said plate-like elements in registering contact with each other with said foamable sheet therebetween is a toggle lock structure of a deep draw through said plates and an upset crimp where one of said plate like elements grips the other in said deep draw.

7. In the structure of claim 5 wherein said means for securing said plate-like elements in registering relation with said foamable sheet therebetween are contacted protuberances integrally secured.

8. A passage blocking sandwich fixture comprising: a pair of rigid plate-like elements; a gasket-like sheet of selectively activated expandable sealing adhesive foamable material of the same configuration as said plate-like elements sandwiched between said plate-like elements; interval spacer retainers holding said plate-like elements against said gasket-like sheet of foamable material; and clip elements extending from one or both of said plate like elements for locating, steadying, and securing said sandwich fixture in said passage preliminary to activating said foamable sheets and expanding said foamable material to close said passage at said fixture position.

* * * * *